United States Patent
Ruetter et al.

(10) Patent No.: US 7,086,784 B2
(45) Date of Patent: Aug. 8, 2006

(54) BEARING UNIT FOR THE HUB OF A VEHICLE WHEEL EQUIPPED WITH A TIRE INFLATING SYSTEM

(75) Inventors: Andreas Ruetter, Pinerolo (IT); Luca Zavaglia, Rivoli (IT); Michele Musso, Rosta (IT); Marco Brunetti, Turin (IT)

(73) Assignee: SKF Industrie S.p.A., Turin (IT)

( * ) Notice: Subject to any disclaimer, the term of this patent is extended or adjusted under 35 U.S.C. 154(b) by 185 days.

(21) Appl. No.: 10/447,180

(22) Filed: May 27, 2003

(65) Prior Publication Data

US 2004/0005104 A1    Jan. 8, 2004

(30) Foreign Application Priority Data

May 31, 2002    (IT)    ............ TO2002A0464

(51) Int. Cl.
  F16C 13/00    (2006.01)
  F16C 19/00    (2006.01)
  B60C 23/10    (2006.01)
(52) U.S. Cl. .................. 384/544; 384/465; 384/477; 152/417
(58) Field of Classification Search ........... 384/467, 384/465, 470, 473, 474, 475, 477, 484, 486, 384/544; 152/415, 416, 417, 418; 277/465
See application file for complete search history.

(56) References Cited

U.S. PATENT DOCUMENTS

| 2,447,838 | A | * | 8/1948 | Bergstrom et al. | .......... 384/571 |
| 3,214,182 | A | * | 10/1965 | Herbruggen | ............... 277/465 |
| 4,036,112 | A | * | 7/1977 | Hubschmann | ................. 92/80 |
| 4,120,541 | A | * | 10/1978 | Schiemann | ................ 384/472 |
| 4,400,040 | A | * | 8/1983 | Toth et al. | ................... 384/465 |

(Continued)

FOREIGN PATENT DOCUMENTS

DE        37 38 529 A1    10/1988

(Continued)

*Primary Examiner*—Richard Ridley
*Assistant Examiner*—Colby Hansen
(74) *Attorney, Agent, or Firm*—Merchant & Gould P.C.

(57) ABSTRACT

A bearing unit comprises a radially outer stationary race (1) and a pair of radially inner rotatable half-races (2a, 2b). An intermediate annular chamber (8) is defined between the outer race (1) and the inner half-races (2a, 2b). The intermediate chamber communicates with the outside through first air passages (5) formed in the outer race (1) and with the inside of the bearing unit through second radial air passages (6) defined between the inner half-races (2a, 2b). An intermediate annular member (10) is axially interposed between the inner half-races (2a, 2b) and defines the second passages (6).

3 Claims, 3 Drawing Sheets

U.S. PATENT DOCUMENTS

| | | | |
|---|---|---|---|
| 4,594,938 A * | 6/1986 | Shore | 92/82 |
| 4,844,138 A * | 7/1989 | Kokubu | 152/417 |
| 4,932,451 A * | 6/1990 | Williams et al. | 152/417 |
| 5,080,156 A | 1/1992 | Bartos | |
| 5,221,381 A | 6/1993 | Hurrell, II | |
| 5,503,480 A * | 4/1996 | Caillaut et al. | 384/477 |
| 6,199,611 B1 * | 3/2001 | Wernick | 152/417 |
| 6,428,212 B1 * | 8/2002 | Tanaka | 384/475 |

FOREIGN PATENT DOCUMENTS

| | | |
|---|---|---|
| DE | 3738529 | 10/1988 |
| DE | G 90 17 861.0 | 11/1990 |
| DE | 39 29 677 A1 | 3/1991 |
| EP | 0 208 540 | 6/1986 |
| EP | 0 224 674 | 6/1987 |
| EP | 0 224 674 B1 | 6/1987 |
| EP | 0 521 719 | 5/1992 |
| EP | 0 656 267 A | 1/1996 |
| EP | 0 713 021 A1 | 7/1997 |
| FR | 2 714 943 | 6/1995 |
| GB | 2 223 207 | 4/1990 |

* cited by examiner

US 7,086,784 B2

BEARING UNIT FOR THE HUB OF A VEHICLE WHEEL EQUIPPED WITH A TIRE INFLATING SYSTEM

TECHNICAL FIELD

The present invention refers to a bearing unit for the hub of a wheel of a vehicle with an on-board tyre inflating system.

BACKGROUND

There are known bearing units for a vehicle wheel hub provided with special vents and sealing devices for blowing into the tyre air pressurized by a source of pressurized air mounted on board of the vehicle. These solutions allow to adjust and/or monitor the air pressure in the tyres.

For a better understanding of the state of the art and problems inherent thereto, there will be at first described a bearing unit of the above mentioned type, with reference to FIG. 1 of the accompanying drawings. A bearing unit of this kind is known, for example, from EP-713 021, EP-656 267, U.S. Pat. No. 5,503,480, DE-37 38 529, FR-2 714 943.

In FIG. 1, a bearing unit comprises an outer race 1, an inner race 2 formed by two axially adjacent half-races 2a, 2b and two sets of bearing balls 3, 4 interposed between the outer race 1 and the inner half-races 2a, 2b. In a radial plane located between the two sets of balls 3, 4 there are several outer radial ducts 5 passing through the bearing outer race 1, and several inner radial passages 6 obtained through the inner bearing race 2. The inner passages 6 are generally defined by the coupling of complementary recesses formed according to a specular symmetry on facing surfaces of the two inner half-races 2a, 2b.

Mounted in the annular space defined by the outer race 1, the inner race 2 and the two sets of balls 3, 4 is a sealing device that allows pressurized air to pass through the outer 5 and inner 6 ducts of the bearing. The sealing device is constituted by two annular sealing members 7 facing one another axially and disposed symmetrically with respect to the radial plane in which the ducts 5 and 6 of the bearing unit lie. The sealing members define an intermediate annular chamber 8. Air pressurized by a pressurized air source mounted on board of the vehicle, which may be part of an automatic system or a system controlled by the driver, passes through specials ducts obtained in the suspension standard of the wheel where the bearing is housed, passes through the outer ducts 5, in the intermediate annular chamber 8, through the inner ducts 6, and from here is conveyed through other ducts to the wheel rim and finally the tyre.

SUMMARY

The object of the present invention is to allow to inflate pressurized air to the wheel tyre through the hub, without having to form conventional radial bores or recesses in the inner half-races of the bearing. The formation of said bores involves a constructional complication that may adversely affect the raceways of the bearing races, which, as known, have very low admissible tolerances.

This and other objects and advantages, that will be better understood in the following, are accomplished according to the invention by a bearing unit having one or more of the features as described herein.

Another object of the present invention is to improve the flow of air through the bearing, particularly through its rotating part.

DESCRIPTION OF THE DRAWINGS

There will now be described a few preferred, but not limiting embodiments of a bearing unit according to the invention, reference being made to the accompanying drawings, in which:

FIG. 3 is a perspective view of an annular element which the bearing unit of FIG. 2 is provided with;

Referring now to FIG. 2, a bearing unit for the hub of a vehicle wheel includes an outer stationary race 1, two axially aligned inner half-races 2a, 2b, and two sets of rolling balls 3, 4 interposed between the outer race 1 and the inner half-races 2a, 2b.

DETAILED DESCRIPTION

Figure 2:
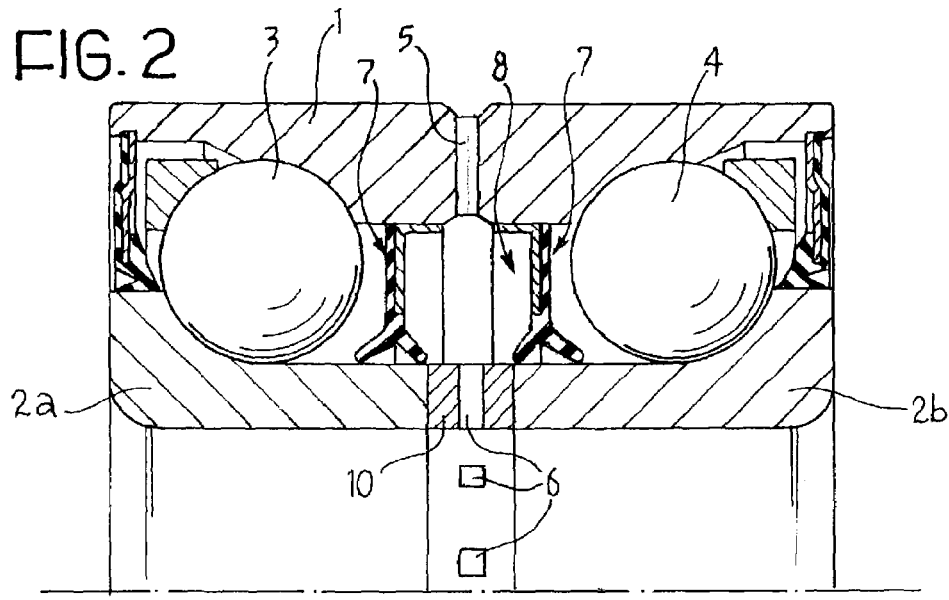
FIG. 2 is an schematic axial cross-sectional view of a bearing unit according to a first embodiment of the present invention.

The general arrangement of most of the elements of the bearing unit illustrated in FIG. 2 is generally known. Only the elements of specific importance and interest for the purposes of the implementation of the present invention will therefore be described in detail in the following description. For the construction of the parts and elements not shown in detail, reference may therefore be made to any of the above mentioned documents. Other constructional solutions may be found, for example, in U.S. Pat. No. 5,221,381, EP-521 719, U.S. Pat. No. 5,080,156, GB-2 223 207, U.S. Pat. No. 4,844,138, EP-208 540. It is sufficient here to remind that in the stationary outer race 1 there is formed a passage 5 through which the air coming from a source of pressurized air mounted on board of the vehicle is let into an intermediate chamber 8 between the rotating and fixed races of the bearing. The chamber 8 is delimited laterally by a pair of sealing members 7 fixed to the stationary race 1 and in sliding contact with the half-races 2a, 2b.

An important characteristic of the solution according to the invention is that between the inner half-races 2a, 2b there is axially interposed an intermediate annular member 10 in which there are formed radial passages 6 that establish communication between the intermediate chamber 8 and the inner part of the bearing unit, from where the air is conveyed through other conduits (not shown) to the wheel rim and then the tyre.

Figure 3:
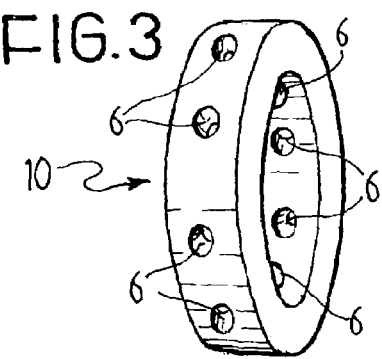

In the embodiments of FIGS. 2 and 3 the passages 6 and the passages 5 formed through the outer bearing race 1 lie substantially in the same central radial plane.

Figure 4:
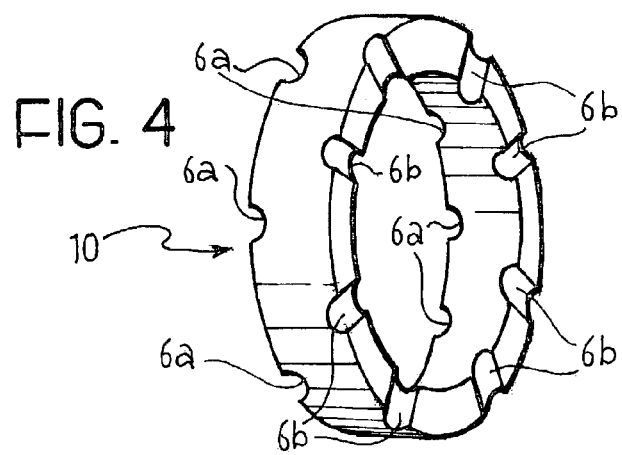
FIG. 4 is a perspective view of an annular member according to a second embodiment of the invention.
Figure 5:
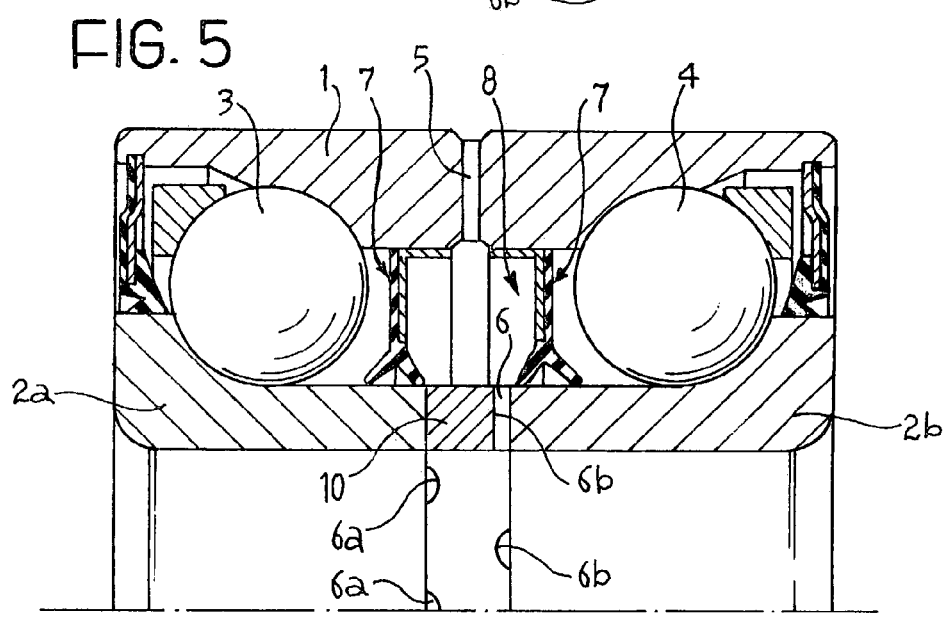
FIG. 5 is schematic axial cross-sectional view of a bearing unit provided with the annular member of FIG. 4.

In the alternative embodiment of FIGS. 4 and 5, formed in the opposite side faces of the annular member 10 are side recesses 6a, 6b which, in the assembled condition of FIG. 5, defined radial passages 6 with the side faces of the respective adjacent half-race 2a, 2b.

Figure 1:
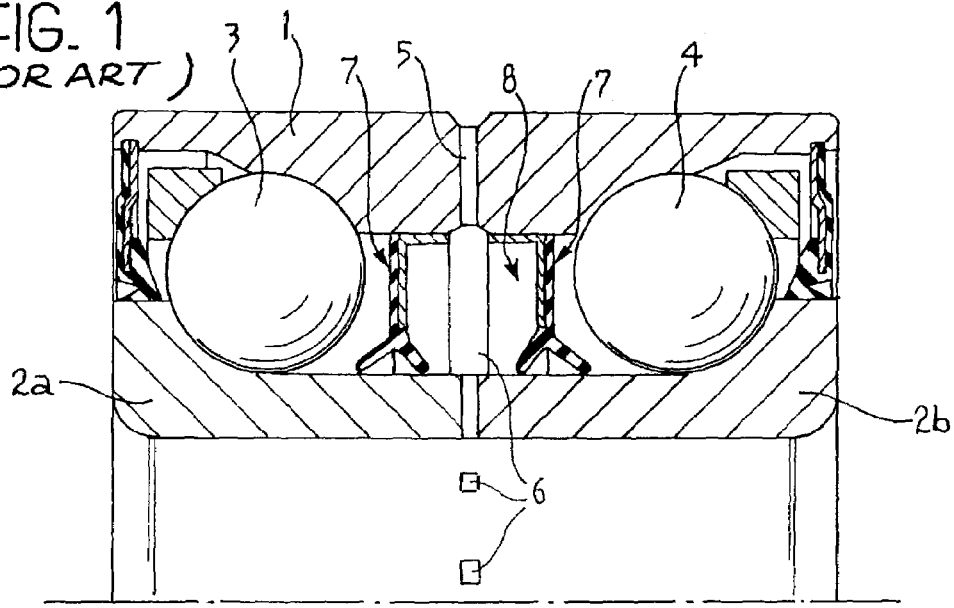
FIG. 1 is a schematic axial cross-sectional view of a bearing unit of known kind for the hub of the wheel of a vehicle equipped with a tyre inflating system.

As it will be appreciated, the half-races 2a, 2b are free of conventional bores and recesses defining the radial passages of the type indicated 6 in FIG. 1. Advantageously, this allows to use inner half-races of standard design,
avoid further perforations and similar operations in the finished half-races,
reduce manufacturing time for the half-races, and
avoid the risk of generating plastic deformation in the half races, inadmissible for the low tolerances that the race ways must exhibit.

The passage of air through the bearing unit according to the present invention takes place similarly as in bearing units of known kind.

Figure 6:
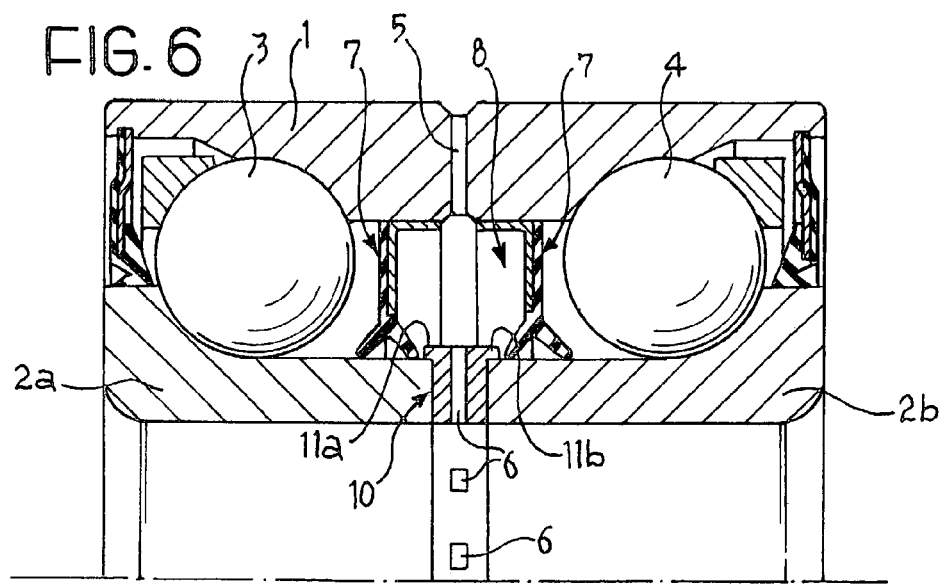
FIG. 6 is a partial, schematic axial cross-sectional view of a bearing unit provided with an annular member according to a third embodiment of the invention.

In the embodiment shown in FIG. 6, the annular member 10 forms a pair of opposite side flanges 11a, 11b extending in an axial direction for engaging the cylindrical surfaces of half-races 2a, 2b so as to prevent the annular member 10 from being separated from the rest of the bearing unit during transport and handling steps preceding the assembling on the hub.

Figure 7:
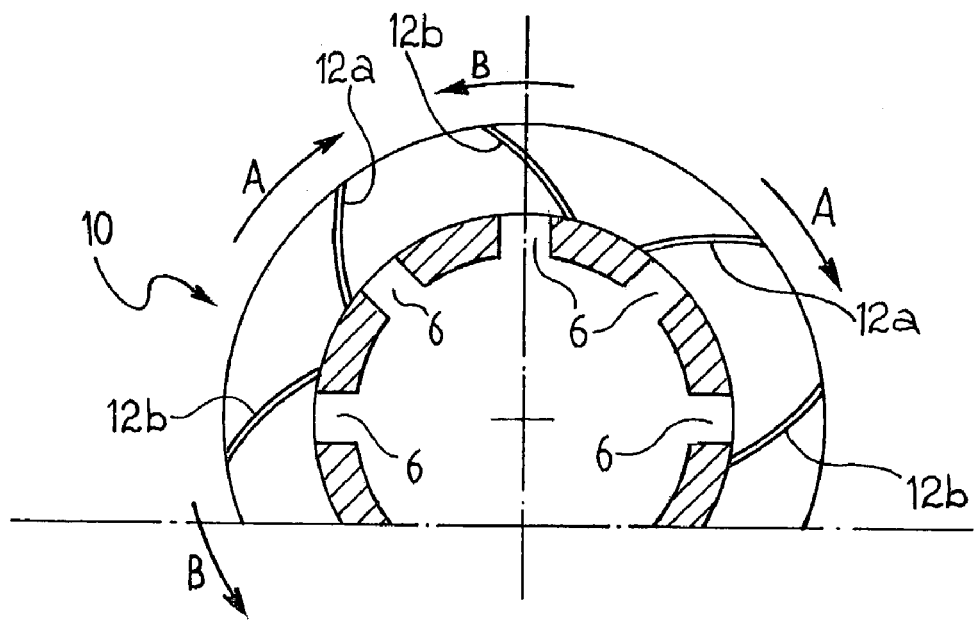
FIG. 7 is a schematic radial cross-sectional view of an annular member according to a fourth embodiment of the invention.
Figure 8:
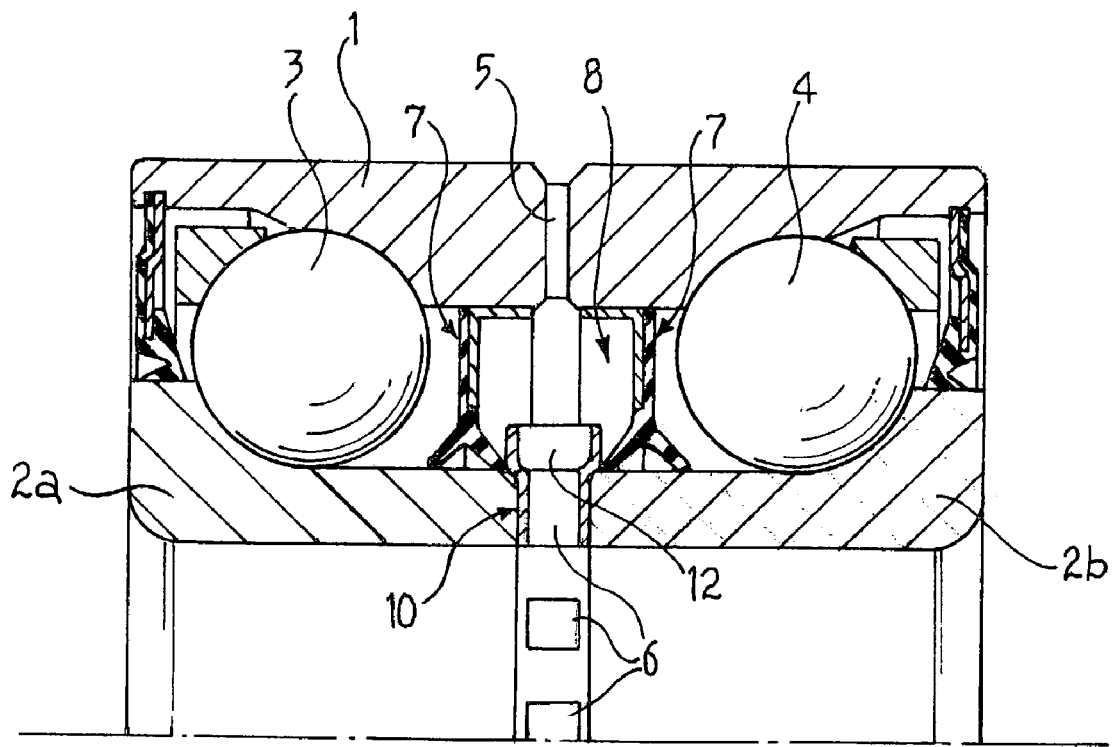
FIG. 8 is a partial schematic axial cross-sectional view of a bearing unit provided with the annular member of FIG. 7.

With reference to FIGS. 7 and 8, according to another embodiment of the invention, the annular member 10 forms a plurality of blade surfaces 12a, 12b radially protruding in the intermediate annular chamber 8. Each blade surface is inclined forwardly with respect to a direction of rotation. The blade surfaces 12a, 12b are each disposed close to one of the passages 6 and extend from an edge of the passage (here defined "trailing" edge with reference to a direction of rotation) towards the outside and forwardly in such a direction of rotation. Owing to this arrangement, when the inner half-races rotate fast with the hub, the blade surfaces capture air in the intermediate chamber 8 and convey it into the passages 6 formed through the annular member 10. The annular member 10 in this embodiment of the invention functions as an air conveyor rotor. In the preferred embodiment shown schematically in FIG. 7, the blade surfaces comprise both surfaces 12a inclined forwardly with respect to the direction of rotation indicated by arrow A, and surfaces 12b inclined forwardly with respect to the opposite direction of rotation indicated by arrow B. A bearing unit provided with an air conveyor rotor of this type has the further advantage that it can be indifferently mounted on a wheel on the left or the right side of the vehicle. In one case, when the direction of rotation is that indicated by arrow A, the air will be captured into chamber 8 by the surfaces 12a, and in the other case by the surfaces 12b.

To improve the capturing of air to be conveyed through the bearing, the blade surfaces are preferably curved with a concavity facing one of the two possible directions of rotations.

It is to be understood that the invention is not limited to the embodiments here described and illustrated which are to be considered as examples of a bearing units according to the invention. The invention is likely to undergo modifications as to the shape and location of parts, constructional and functional details, and materials employed. For example, the bearing units here shown are units of the so-called first generation. However, reference to this possible field of use should not in any way be interpreted as limiting the scope of the patent, as the invention is equally applicable to bearing units of the so-called second or third generation with flanged races.

What is claimed is:

1. A bearing unit for a wheel hub of a vehicle equipped with a system for supplying pressurized air to a tire through the hub of the wheel, the bearing unit comprising:
   a radially outer stationary race,
   a pair of radially inner rotatable half-races,
   an intermediate annular chamber between the outer race and the inner half-races,
   at least a first inner air passage formed through the outer race and communicating with the intermediate annual chamber,
   at least a second essentially radial inner air passage defined between the inner half-races and communicating with the intermediate annular chamber;
   wherein the bearing unit further comprises an intermediate annular member axially interposed between the inner half races and defining at least partially said second passage, and
   wherein the intermediate annual member has a side face disposed adjacent to one of the two inner half-races, at least a side recess being formed in the side face, the side recess defining said at least one second passage with the inner half-race adjacent to said side face.

2. A bearing unit according to claim 1, wherein the half-races are free of radial recesses or passages.

3. A bearing unit according to claim 1, wherein the unit comprises at least two of said second passages and that the intermediate annular member has two opposite side faces each of which is disposed adjacent to a respective inner half-race, at least a side recess being formed in each of said side faces so as to define one of said second passages with the respective adjacent inner half-race.

* * * * *